United States Patent [19]

Tezuka

[11] Patent Number: 5,097,921
[45] Date of Patent: Mar. 24, 1992

[54] TORQUE DISTRIBUTION CONTROL SYSTEM FOR A FOUR-WHEEL DRIVE MOTOR VEHICLE

[75] Inventor: Kazunari Tezuka, Niiza, Japan

[73] Assignee: Fuji Jukogyo Kabushiki Kaisha, Tokyo, Japan

[21] Appl. No.: 556,284

[22] Filed: Jul. 20, 1990

[30] Foreign Application Priority Data

Aug. 28, 1989 [JP] Japan .................................. 1-222364

[51] Int. Cl.$^5$ ............................................. B60K 28/16
[52] U.S. Cl. .................................. 180/197; 180/249; 364/426.03; 475/249
[58] Field of Search .................. 180/197, 249, 248; 364/426.02, 426.03; 475/221, 249, 86

[56] References Cited

U.S. PATENT DOCUMENTS

| | | | |
|---|---|---|---|
| 4,215,593 | 8/1980 | Shono et al. | 475/221 X |
| 4,538,700 | 9/1985 | Suzuki | 180/197 X |
| 4,776,424 | 10/1988 | Naito | 180/197 |
| 4,866,624 | 9/1989 | Niskikawa et al. | 364/426.03 |
| 4,884,650 | 12/1989 | Fujiki et al. | 180/197 |
| 4,936,406 | 6/1990 | Tezuka et al. | 180/249 |
| 4,966,249 | 10/1990 | Imaseki | 180/197 X |
| 5,025,401 | 6/1991 | Kato | 180/197 X |

Primary Examiner—Charles A. Marmor
Assistant Examiner—Kevin Hurley
Attorney, Agent, or Firm—Martin A. Farber

[57] ABSTRACT

A central differential distributes an output torque of a transmission to front wheels and rear wheels of a vehicle. A fluid-operated restricting device is provided for restricting the differential operation of the central differential. The central differential is arranged to distribute a larger torque to the rear wheels than the front wheels. A slip ratio of the rear wheels is calculated based on rear-wheel speed and vehicle speed. The fluid-operated restricting device is operated in accordance with the slip ratio, in such a manner that the restricting magnitude increases with an increase of the slip ratio.

10 Claims, 9 Drawing Sheets

TORQUE DISTRIBUTION CONTROL SYSTEM FOR A FOUR-WHEEL DRIVE MOTOR VEHICLE

BACKGROUND OF THE INVENTION

The present invention relates to a torque distribution control system for a four-wheel drive motor vehicle having a central differential, and more particularly to a control system in which output torque of a transmission is unequally distributed to front wheels and rear wheels in accordance with driving conditions.

In a full-time four-wheel drive motor vehicle with a central differential, a fluid-operated multiple-disk friction clutch is provided for restricting the differential operation. The torque distributed to the front wheels and the rear wheels is controlled by the torque of the friction clutch, thereby improving straight-ahead stability, acceleration and driveability. In order to widely control the distribution of the torque, it is necessary for the central differential to be arranged to unequally distribute the torque to the front wheels and the rear wheels. There are two methods for the unequal distributing system. One of the methods is a front-weighed distribution which is weighed to the front wheels, and the other is a rear-weighed distribution method which is weighed to the rear wheels. In the front-wheel weighed system, larger torque is transmitted to the front wheels. Accordingly, although the vehicle has good straight-ahead stability, it is inferior in steerability because of a drifting out of the course. In the rear-wheel weighed system, the larger torque is transmitted to the rear wheels. The vehicle has good steerability and driveability on a dry road. However, the vehicle is liable to spin on a slippery road.

On the other hand, a disadvantage of the four-wheel drive vehicle is that all of the four wheels may slip (slipping spin) at the same time, causing difficulty in driving.

In order to ensure driving stability of the vehicle, the torque to the rear wheels is set to a larger value than that to the front wheels, so that the rear wheels may slip first. Thus, the vehicle can be safely driven by the front wheels at small torque while the rear wheels idle.

Since the driving force (acceleration force) is distributed to the four wheels, each wheel can sustain a larger side force. Thus, in order to ensure driving stability in the rear-wheel weighted system, it is necessary to keep the sustainable side force of the rear wheels large.

The driving force and the side force change with the slip ratio of the wheel to the ground (slip ratio is described hereinafter in detail). The slip ratio changes in accordance with the condition of the road surface and the coefficient of friction of the tire. In particular, if the slip ratio is larger than a predetermined value (10 to 20%), the driving force and the sustainable side force remarkably reduce, which results in a deterioration of driving stability. Accordingly, the slip ratio of the rear wheel is controlled so as not to exceed the predetermined value. If system operates to increase the torque distributed to the front wheels in accordance with the reduction of the sustainable side force, slipping of the rear wheels is prevented to ensure the driving force. Therefore, it is desirable to control the torque distribution based on the rear-wheel slip ratio.

Japanese Patent Applications Laid-Open 62-55228, 62-261539 and 63-8026 disclose four-wheel drive control systems in which a central differential comprising a simple planetary gear device is provided. Standard torque to the front and rear wheels is unequally distributed at a ratio determined by a difference between pitch circles of gears of the planetary gear device. Torque capacity of the clutch is controlled in accordance with the difference between speeds of the front wheels and the rear wheels, or with a predetermined value corrected by vehicle speed and steering angle.

However, in conventional systems, the standard torque distribution ratio determined by the ratio of the pitch circles can not be changed, unless diameters of the gears change. However, it is difficult to change the diameters because of a limitation of space. Since the distribution of torque to the rear wheels can not be set to a large value, a control range of the torque distribution becomes small.

Further, the torque distribution is controlled by restricting the differential operation of the central differential. Therefore, slip conditions of the wheels on the road surface can not be detected so that it is impossible to actively control the torque distribution in accordance with the slip conditions. In addition, with a low coefficient of friction on a road surface, if the vehicle is driven under slipping conditions and the speed difference of the front wheels and the rear wheels is small, the torque distribution can not be controlled.

SUMMARY OF THE INVENTION

An object of the present invention is to provide a torque distribution control system for a four-wheel drive motor vehicle in which a large torque is distributed to rear wheels, thereby enabling control over a wide torque distribution range.

Another object of the present invention is to provide a system which may ensure driveability, driving stability and steerability in accordance with slip conditions.

According to the present invention, there is provided a system for controlling torque distributed to front wheels and rear wheels of a motor vehicle having a transmission, a central differential for distributing an output torque of the transmission to the front wheels and the rear wheels of the vehicle, and a restricting device for restricting the differential operation of the central differential. The system further includes the central differential being arranged to distribute a larger torque to the rear-wheels than to the front wheels, calculator means for calculating a slip ratio of the rear wheels, means for setting a restricting torque for determining restricting torque of the fluid-operated restricting device.

At slipping of the front wheels, the slip ratio is calculated based on angular velocity of the front wheels before the slipping and acceleration of the vehicle.

The other objects and features of this invention will become understood from the following description with reference to the accompanying drawings.

DETAILED DESCRIPTION OF THE PREFERRED EMBODIMENTS

Figure 1A:
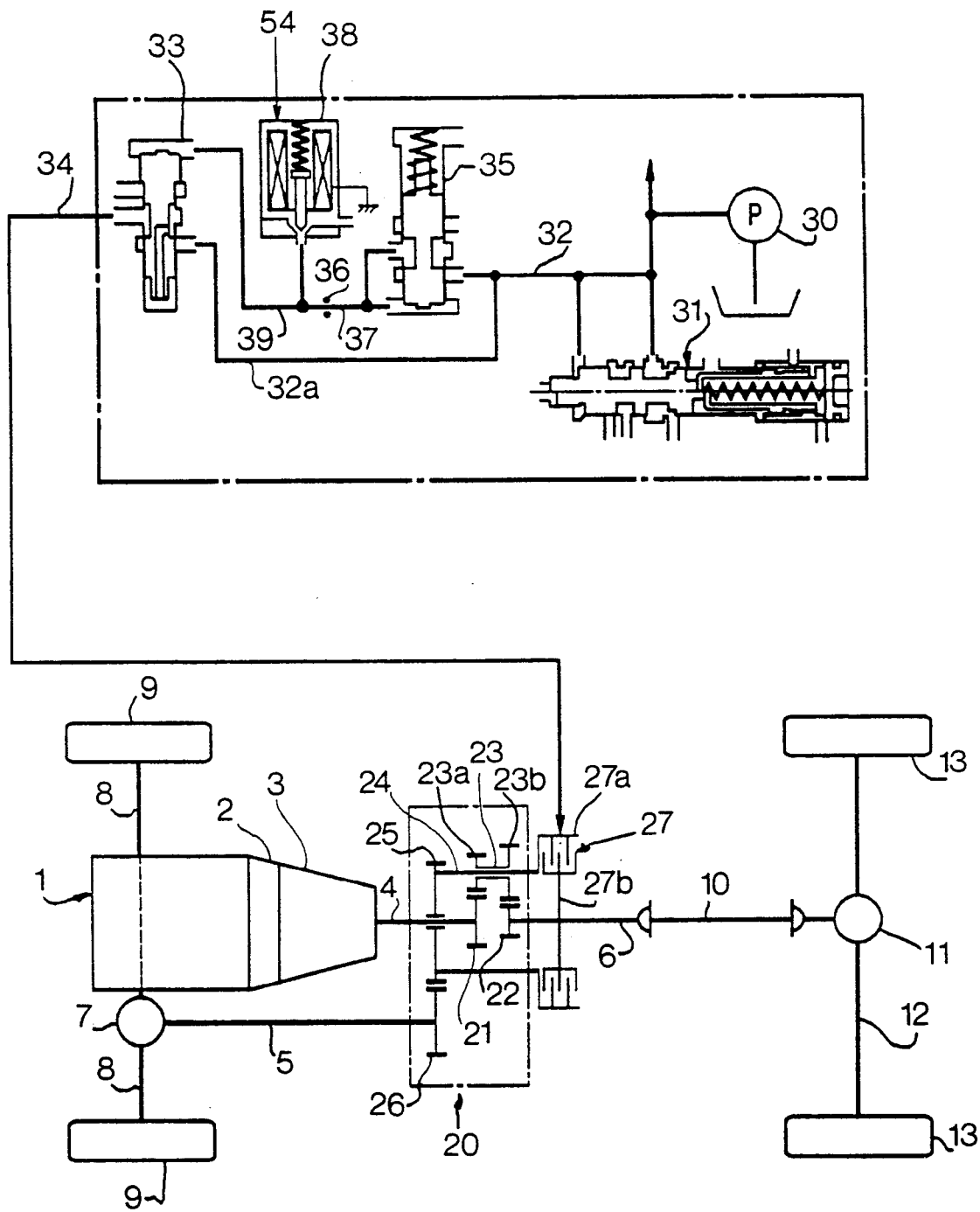
FIGS. 1a and 1b are schematic diagrams showing a power transmission system for a four-wheel drive motor vehicle according to the present invention.

FIG. 1a shows a power transmission system for a four-wheel drive motor vehicle having a central differential according to the present invention. An engine 1 is mounted on a front portion of the vehicle. A clutch 2 and an automatic transmission 3 are operatively connected at the rear of the engine 1 in the longitudinal direction of the vehicle. An output of the automatic transmission 3 is transmitted to an output shaft 4 which is aligned with a central differential 20 for rearwardly transmitting the torque. The output shaft 4 is connected via the central differential 20 to a front drive shaft 5 which is disposed in parallel under the automatic transmission 3 through a pair of reduction gears 25 and 26 of the central differential 20. The front drive shaft 5 is connected to front wheels 9 through a front differential 7 and axles 8. The output shaft 4 is connected to a rear drive shaft 6 through the central differential 20. The rear drive shaft 6 is connected to rear wheels 13 through a propeller shaft 10, a rear differential 11 and axles 12.

The central differential 20 is a complex planetary gear device and comprises a first sun gear 21 integrally formed on the output shaft 4, a second sun gear 22 integrally formed on the rear drive shaft 6, and a combined planet pinion 23 comprising a first planet pinion 23a meshed with the first sun gear 21, and a second planet pinion 23b meshed with the second sun gear 22, and supported on a carrier 24. The carrier 24 is connected to the reduction drive gear 25.

Thus, the output torque from the output shaft 4 of the transmission 3 is transmitted to the carrier 24 and the second sun gear 22 through the first sun gear 21 and pinions 23a, 23b at predetermined respective torque distribution ratios. The difference between the rotating speeds of the carrier 24 and the second sun gear 22 is absorbed by the rotation and revolution of the first and second planet pinions 23a and 23b.

In the central differential 20, the first sun gear 21 is engaged with the first planet pinion 23a and the second sun gear 22 is engaged with the second planet pinion 23b.

Consequently, a standard torque distribution for a front torque $T_F$ and a rear torque $T_R$ can be set to various values by changing radii of pitch circles of the sun gears 21 and 22 and the pinions 23a and 23b.

Thus, the torque distribution ratio of the front wheels 9 and the rear wheels 13 is determined, for example as $$T_F:T_R = 34:66$$

A large standard torque can be distributed to the rear wheels 13.

A fluid-operated multiple-disk friction clutch 27 is provided adjacent the central differential 20 for restricting differential operation of the central differential 20.

The clutch 27 comprises a drive drum 27a secured to the carrier 24, and a driven drum 27b secured to the rear drive shaft 6. When a differential operation restricting clutch torque Tc is produced in the clutch 27, a part of the output torque of the second sun gear 22 is transmitted to the front wheels 9, thereby changing the distribution of the torque. The carrier 24 is coupled with the second sun gear 22 when the clutch 27 is entirely engaged, thereby locking the central differential 20.

In a vehicle with a front-mounted engine, the static weight distribution of a front static weight WF and a rear static weight WR are determined for example as $$WF:WR \approx 62:38$$

when the clutch is directly engaged, and the distribution ratio of the front torque and rear torque is 62:38 which is approximately equal to the weight distribution. Thus, the torque distribution is controlled in the range between the standard torque distribution weighted to the rear wheels 13 and the torque distribution at the complete engagement of the clutch in accordance with the differential operation restricting clutch torque Tc.

A hydraulic circuit of a control system for the clutch 27 comprises an oil pump 30, a pressure regulator valve 31, a pilot valve 35, a clutch control valve 33 and a solenoid-operated duty control valve 38. The regulator valve 31 operates to regulate the pressure of oil supplied from the oil pump 30 driven by the engine to produce a line pressure and the line pressure is applied to line pressure conduit 32. The conduit 32 is communicated with a passage 37 through the pilot valve 35. The passage 37 is communicated with the solenoid-operated duty control valve 38 downstream of an orifice 36, and with an end of the clutch control valve 33 through a passage 39. The conduit 32 is communicated with the clutch control valve 33 through a passage 32a. The clutch control valve 33 is communicated with the clutch 27 through a passage 34. The solenoid-operated valve 38 is operated by pulses from control unit 50 at a duty ratio determined therein, thereby controlling draining of the oil to provide a control pressure. The control pressure is applied to the clutch control valve 33 to control the oil supplied to the clutch 27 so as to control the clutch pressure (torque) and hence the differential operation restricting clutch torque Tc.

Describing an electronic control system, a principle for controlling the torque distribution is described hereinafter.

Figure 2A:
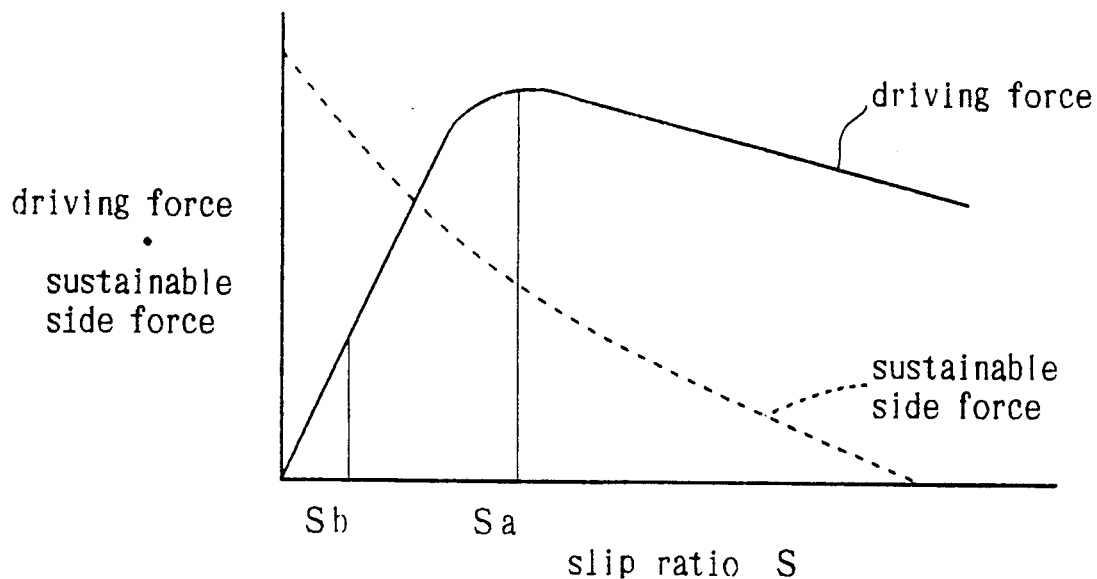
FIG. 2a is a graph showing characteristics of driving force and side force corresponding to slip ratios.

The torque distribution is controlled by a feedback control based on the slip ratio of the rear wheels because the torque to the rear wheels is set to a value larger than that to the front wheels by arranging the central differential 20 so that the rear wheels slip first. FIG. 2a shows relationships between the driving force T or the sustainable side force F corresponding to the slip ratio S. When the slip ratio is zero, the sustainable side force F is maximum and gradually reduces as the slip ratio S increases. The driving force T increases with the slip ratio S and reduces when the slip ratio exceeds a predetermined slip ratio Sa (10 to 20%). Thus, it will be seen that if the slip ratio S is controlled in the range of $S \leq Sa$, a large sustainable side force F is ensured, thereby providing driving stability by rear-wheel weighted driving.

The slip ratio S of the rear wheels is represented as follows with the vehicle ground speed V, the radius of the tire r, and the rear-wheel angular velocity ωR.

$$S = (r \cdot \omega R - V)/(r \cdot R)$$

If the rear-wheel slip ratio S is controlled in a linear range of S<Sa at torque distribution 3:7, the rear-wheel slip ratio S becomes small to be approximately equal to the vehicle speed. Namely, the ground speed V is $$V \approx r \cdot \omega F$$

where ωF is the front-wheel angular velocity and r is the radius of the tire. Thus, the slip ratio S of the rear wheels is represented as follows.

$$\begin{aligned} S &= (r \cdot \omega R - r \cdot \omega F)/(r \cdot \omega R) \\ &= (\omega R - \omega F)/\omega R \end{aligned}$$

In order to prevent malfunctioning of the central differential at cornering, the range smaller than the slip ratio Sb (for example 3%) is determined as a dead zone where apparent slip ratio produced in accordance with the difference between the speed of the front wheels 9 and the speed of rear wheels 13 at a maximum steering angle is included. Thus, the control range becomes Sb<S<Sa. The slip ratio S is calculated within the control range to control the differential operation restricting clutch torque Tc as an increasing function of the slip ratio, so that a part of the torque to the rear wheels 13 is transmitted to the front wheels 9. Consequently, the sustainable side force F of the rear wheels 13 can be increased.

Figure 1B:
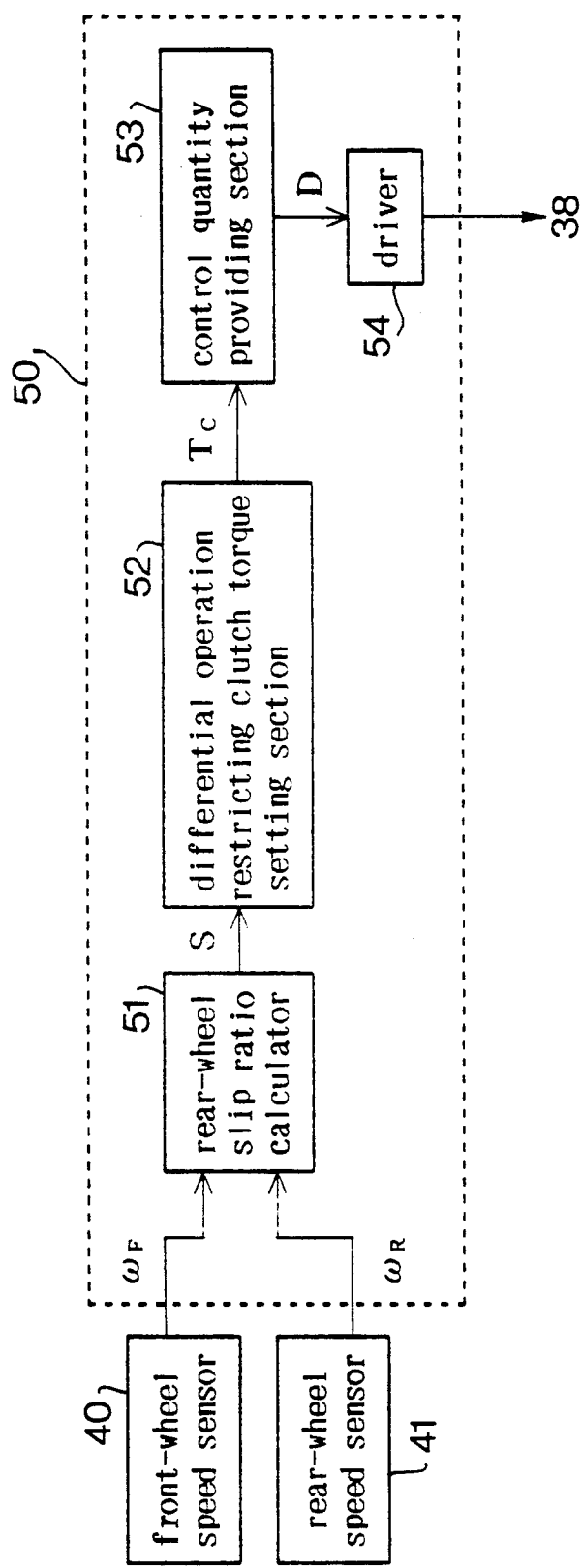

The control unit 50 (FIG. 1b) is supplied with output signals from a front-wheel speed sensor 40 and a rear-wheel speed sensor 41. The control unit 50 has a slip ratio calculator 51 to which a front-wheel angular velocity ωF and a rear-wheel angular velocity ωR from the sensors 40 and 41 are applied. In the slip ratio calculator 51, a slip ratio S is calculated in accordance with the above-mentioned equations. The slip ratio S is applied to a differential operation restricting clutch torque setting section 52. In accordance with the input signal, the clutch torque setting section 52 retrieves the clutch torque Tc from a look-up table.

Figure 2B:
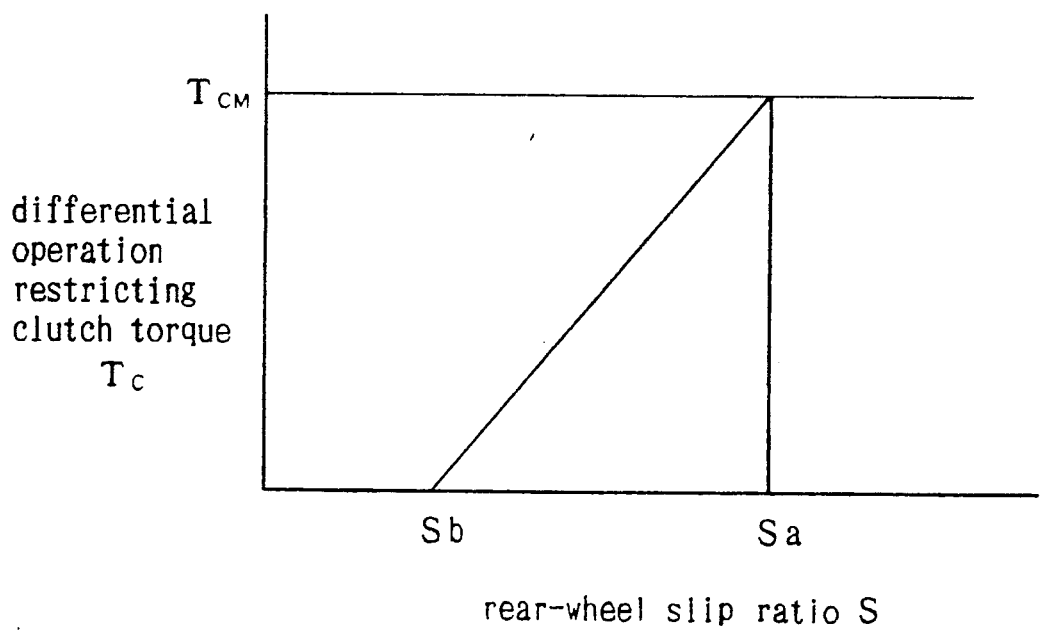
FIG. 2b is a graph showing differential operation restricting clutch torque.

FIG. 2b shows the clutch torque Tc stored in the look-up table. The clutch torque Tc is an increasing function of the slip ratio S in the control range Sb<S<Sa.

The clutch torque Tc is applied to a control quantity providing section 53 where a duty ratio D corresponding to the derived clutch torque Tc is provided. A duty ratio D provided at the section 53 is applied to the solenoid-operated duty control valve 38 through a driver 54.

Figure 3:
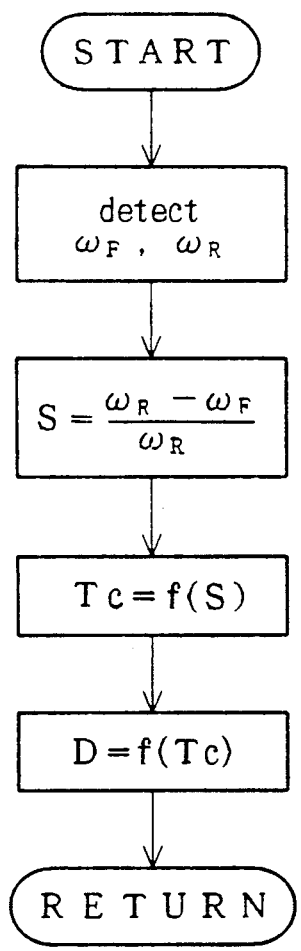
FIG. 3 is a flowchart showing an operation of a control unit in the system.
Figure 4A:
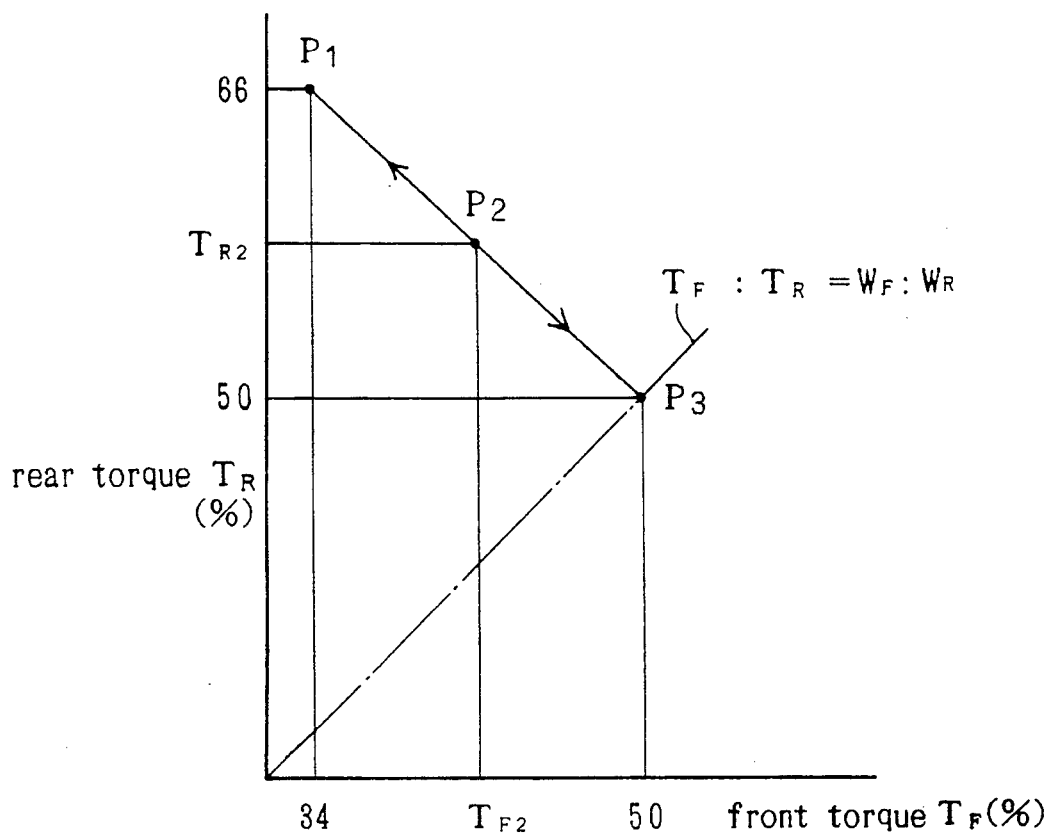
FIG. 4a is a graph showing a relationship between front-wheel torque and rear-wheel torque.
Figure 4B:
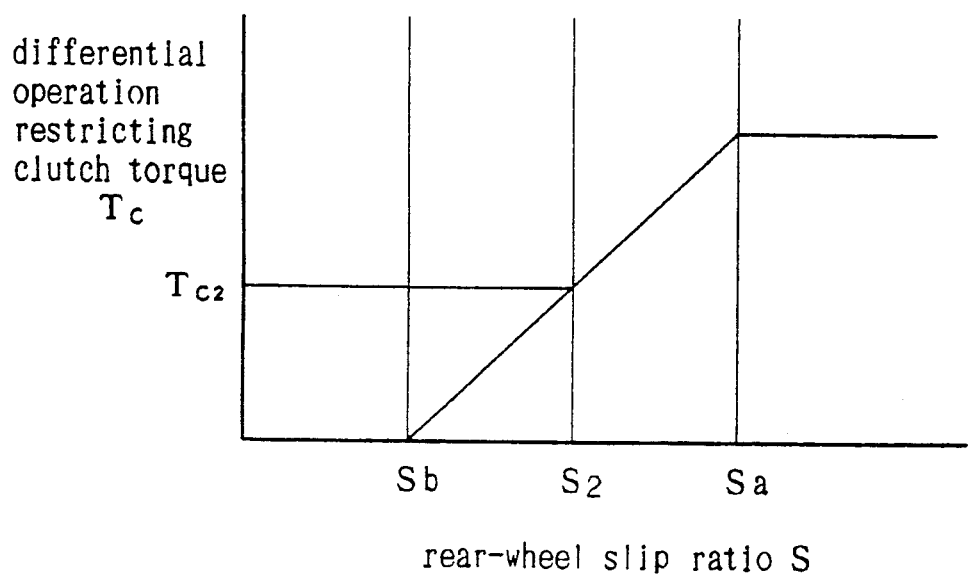
FIG. 4b is a graph showing characteristics of the differential operation restricting clutch torque in accordance with a rear-wheel slip ratio.

The operation of the system will be described hereinafter with reference to the flowchart of FIG. 3 and the graphs of FIG. 4. The power of the engine 1 is transmitted to the transmission 3 through the clutch 2 at which the transmission ratio is automatically controlled. The output of the transmission is transmitted to the first sun gear 21 of the central differential 20. The front torque $T_F$ and the rear torque $T_R$ are determined in accordance with the radii of the gears of the central differential 20. The torque is transmitted to the reduction gear 25 through the carrier 24 at a ratio of 34% for example and to the second sun gear 22 at the ratio of 66%.

The front-wheel angular velocity ωF and the rear-wheel angular velocity ωR are detected by the front-wheel speed sensor 40 and the rear-wheel speed sensor 41. The rear-wheel slip ratio S is calculated in the rear-wheel slip ratio calculator 51 in accordance with the rear wheel angular velocity ωR and with the front-wheel angular velocity ωF which approximates the vehicle speed.

If no slip state (S≦Sb) is detected in the control unit 50 while the vehicle is driven on the dry road having a high coefficient of friction μ, the clutch torque Tc is determined to be zero. A signal corresponding to a large duty ratio is applied to the solenoid-operated duty control valve 38. Thus, the clutch control pressure becomes zero and the clutch control valve 33 operates to close the passage 32a, thereby draining the oil from the clutch 27. The clutch 27 is disengaged and the clutch torque Tc becomes zero so as to render the central differential 20 free.

Accordingly, the torque of the reduction drive gear 25 is transmitted to the front wheels 9 through the reduction driven gear 26, the front drive shaft 5 and the front differential 7 at the ratio of 34%. The torque at the distribution ratio of 66% is transmitted to the rear wheels 13 through the second sun gear 22, the rear drive shaft 6, the propeller shaft 10 and the rear differential 11. Thus, full-time four-wheel driving is established at a point P1 of FIG. 4a.

When the vehicle makes a turn, the rotating difference in the speeds of the front and the rear wheels 9, 13 is absorbed by the rotation and revolution of the first and second pinions 23a and 23b, so that the vehicle smoothly negotiates a sharp corner due to the differential operation of the central differential 20.

If the vehicle is driven on a slippery road, the rear wheels 13 slip first because the larger amount of the torque is distributed to the rear wheels 13. If the calculated rear-wheel slip ratio reaches a value S2 in the control range, the driving of the rear wheels 13 is unstable. Therefore, a differential operation restricting clutch torque T2 is determined corresponding to the slip ratio S2. Consequently, the clutch torque $T_{C2}$ is produced in the clutch 27. The clutch 27 is provided in parallel with the carrier 24 and the second sun gear 22 of the central differential 20. Accordingly, the torque is transmitted from the second sun gear 22 to the carrier 24 to increase the torque to the front wheels 9. Thus, the distribution ratio of the front torque and the rear torque $T_F:T_R$ becomes $T_{F2}:T_{R2}$ at a point P2 of FIG. 4a. To the contrary, the torque to the rear wheels 13 is reduced to eliminate slipping, thereby improving driveability to ensure good operability and safe driving.

When the slip ratio S becomes larger than the value Sa (S≧Sa) and the driving is extremely unstable, the differential operation restricting torque Tc becomes maximum. Thus, the carrier 24 is directly engaged with the second sun gear 22 to lock the central differential 20. Thus, the completely coupled four-wheel driving is established in accordance with the torque ratio distribution ratio 50:50 corresponding to the axle loads of the front and the rear wheels 9, 13 at a point P3 of FIG. 4a. Thus, the torque distribution is continuously controlled in accordance with the slipping condition for preventing the wheels 9, 13 from slipping.

FIG. 5 shows a second embodiment of the present invention for correcting the slip ratio in accordance with steering angle.

The correction with the steering angle is based on the slip angle at cornering. When the vehicle makes a turn, the front and rear wheels 9, 13 slide in a lateral direction to produce the side force balanced with the centrifugal force. The slip ratio S calculated in the above described equation is based on a front-wheel angular velocity $\omega F$ instead of a ground speed V. Consequently, the slip ratio S is calculated to be smaller than the actual slip ratio because the front-wheel angular velocity $\omega F$ is larger than the ground speed V. Thus, it is necessary to compensate the decrease of the slip ratio S with a correcting quantity determined in accordance with a steering angle $\psi$ and the vehicle (ground) speed V taking account of the tight corner braking. Further, the correction may also be made with a difference $\Delta\omega$ between the speed of the front wheels 9 and the speed of the rear wheels 13 as $$\Delta\omega = f(\psi, V))$$

The slip ratio S of the rear wheels 13 is calculated as follows.

$$S = (\omega R - \omega F + \Delta\omega)/\omega R$$

Figure 5A:
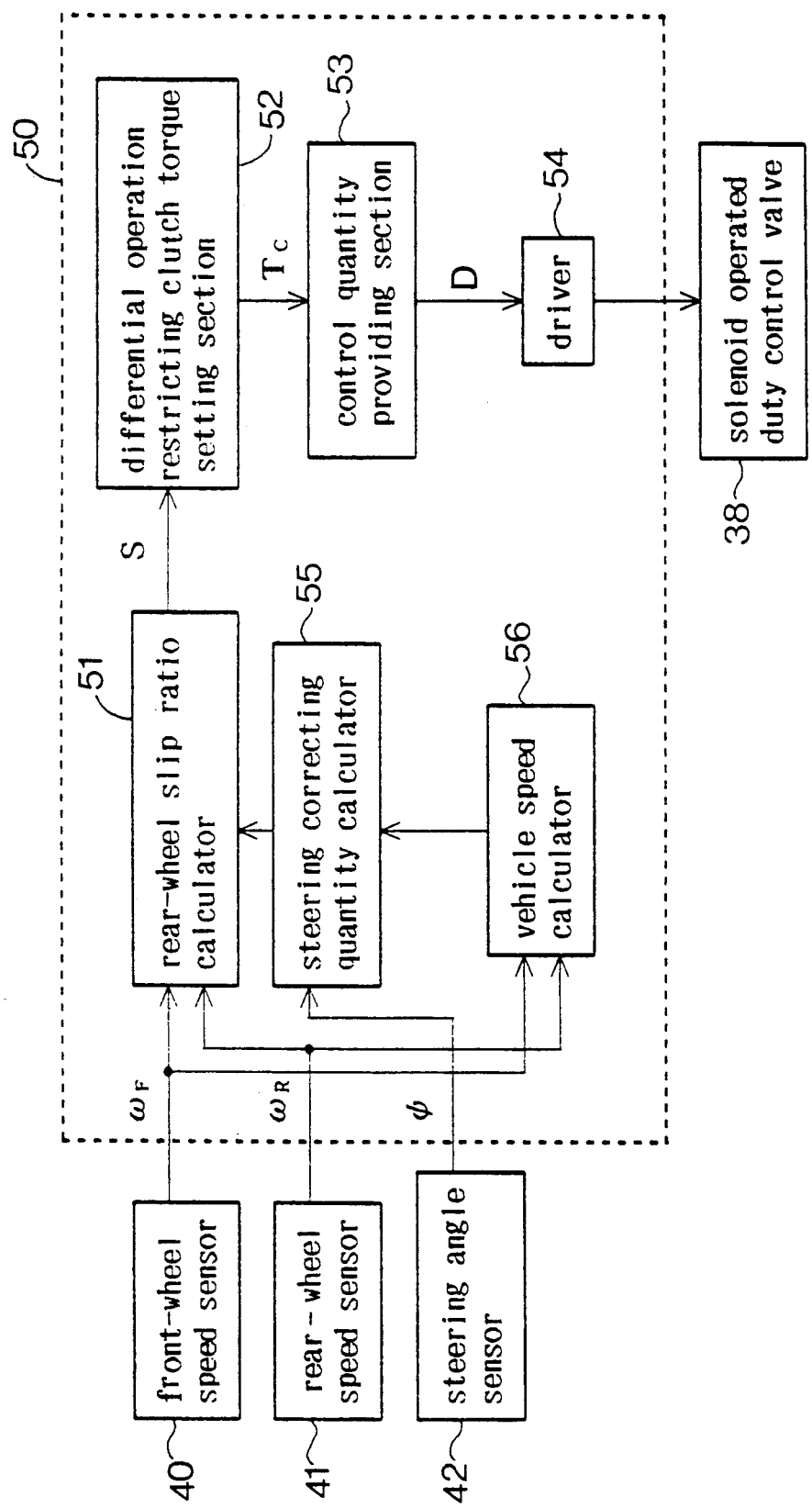
FIG. 5a is a block diagram showing a second embodiment of the present invention.
Figure 5B:
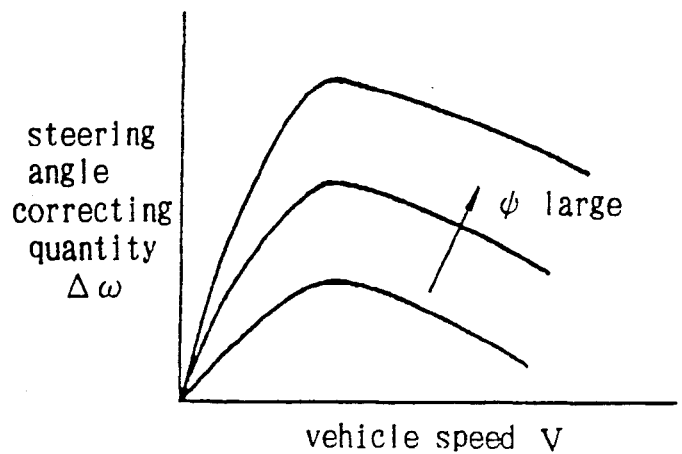
FIG. 5b is a graph showing a look-up table for correcting quantity dependent on steering angle.

Referring to FIG. 5a, the control unit 50 of the second embodiment is provided with a steering angle sensor 42. A steering angle $\psi$ is applied to a steering correcting quantity calculator 55. The front-wheel and rear-wheel angular velocities $\omega F$ and $\omega R$ are applied to a vehicle speed calculator 56 in which the ground speed V is calculated in accordance with the average of both angular velocities $\omega F$, $\omega R$. The vehicle speed V is applied to the steering correcting quantity calculator 55. In the calculator 55, a look-up table for the steering correcting quantity $\Delta\omega$ is provided as shown in FIG. 5b. The correcting quantity $\Delta\omega$ is an increasing function of the steering angle $\psi$. The correcting quantity $\Delta\omega$ is determined to a small value when the vehicle speed V is smaller than a predetermined value, thereby preventing the tight corner braking. The correcting quantity $\Delta\omega$ is gradually reduced as the turning radius increases when the vehicle speed V is larger than the predetermined value. The correcting quantity $\Delta\omega$ is derived from the look-up table in accordance with the vehicle speed V and the steering angle $\psi$. The correcting quantity $\Delta\omega$ is applied to the slip ratio calculator 51 where the slip ratio S is calculated in accordance with the above-mentioned equation.

Figure 5C:
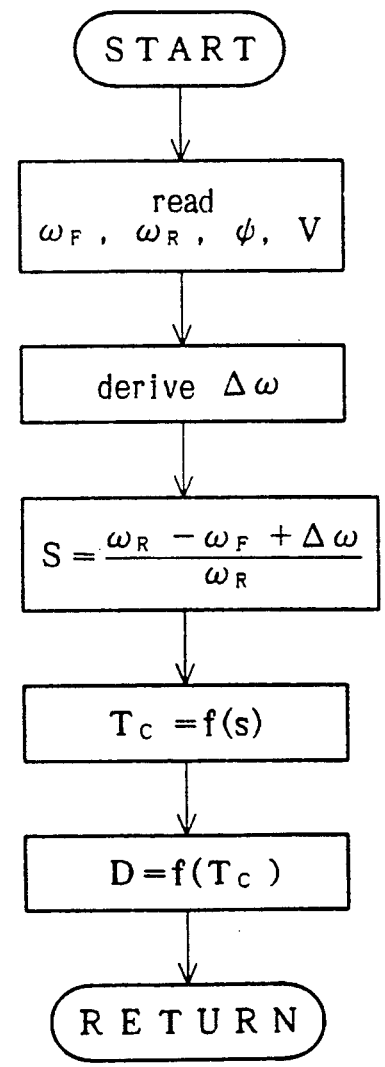
FIG. 5c is a flowchart showing the operation of the second embodiment.

The operation of the system is shown in the flowchart of FIG. 5c. The rear-wheel slip ratio S is corrected in accordance with the steering correcting quantity $\Delta\omega$ in dependency on the steering angle $\psi$ and the vehicle speed V. The corrected slip ratio S is equal to the actual slip ratio at cornering. In the control range in accordance with the slip ratio, the differential operation restricting clutch torque Tc is set to a proper value corresponding to the slip ratio. Thus, the distribution of the torque is exactly controlled.

Figure 6A:
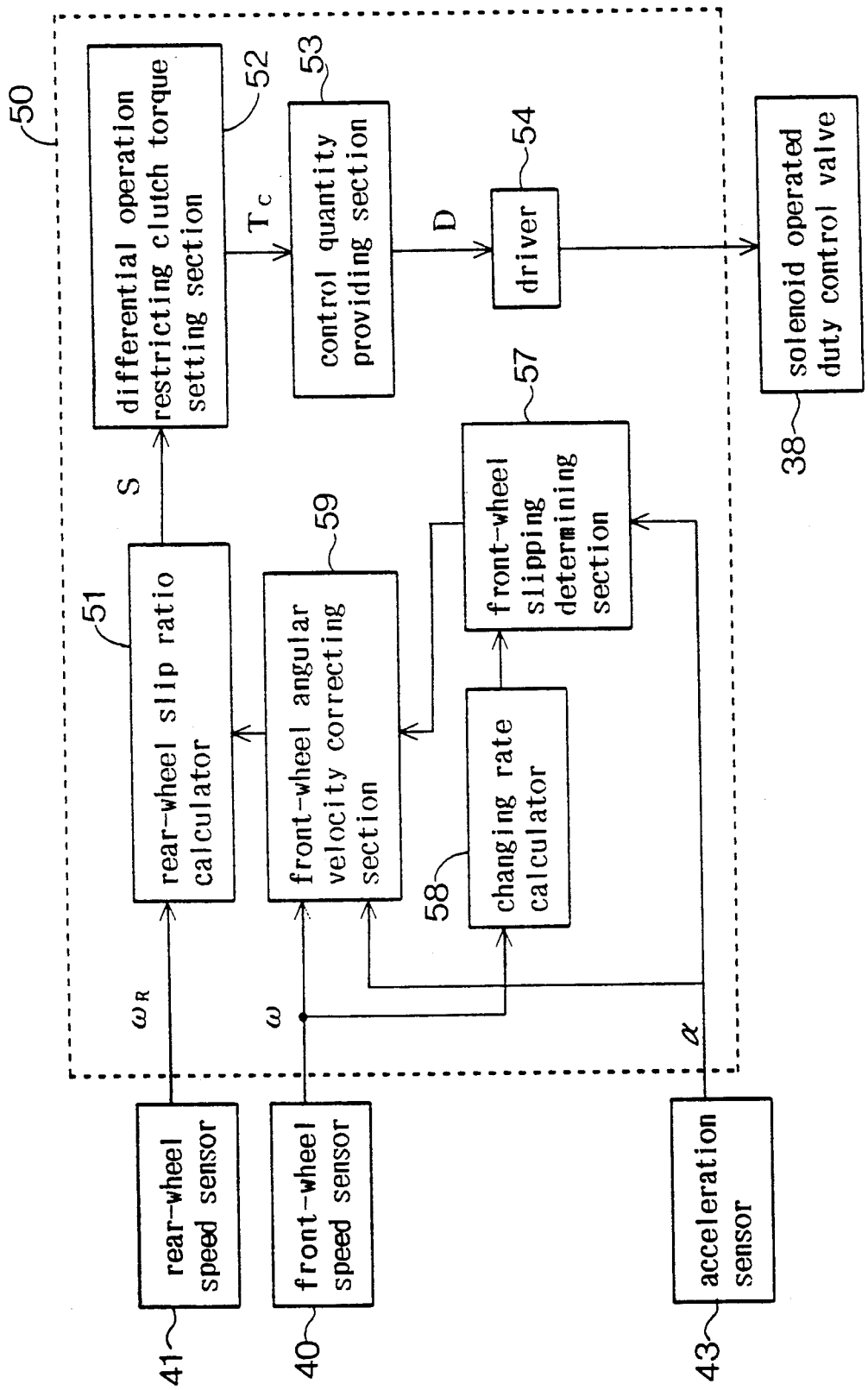
FIG. 6a is a block diagram of a third embodiment.
Figure 6B:
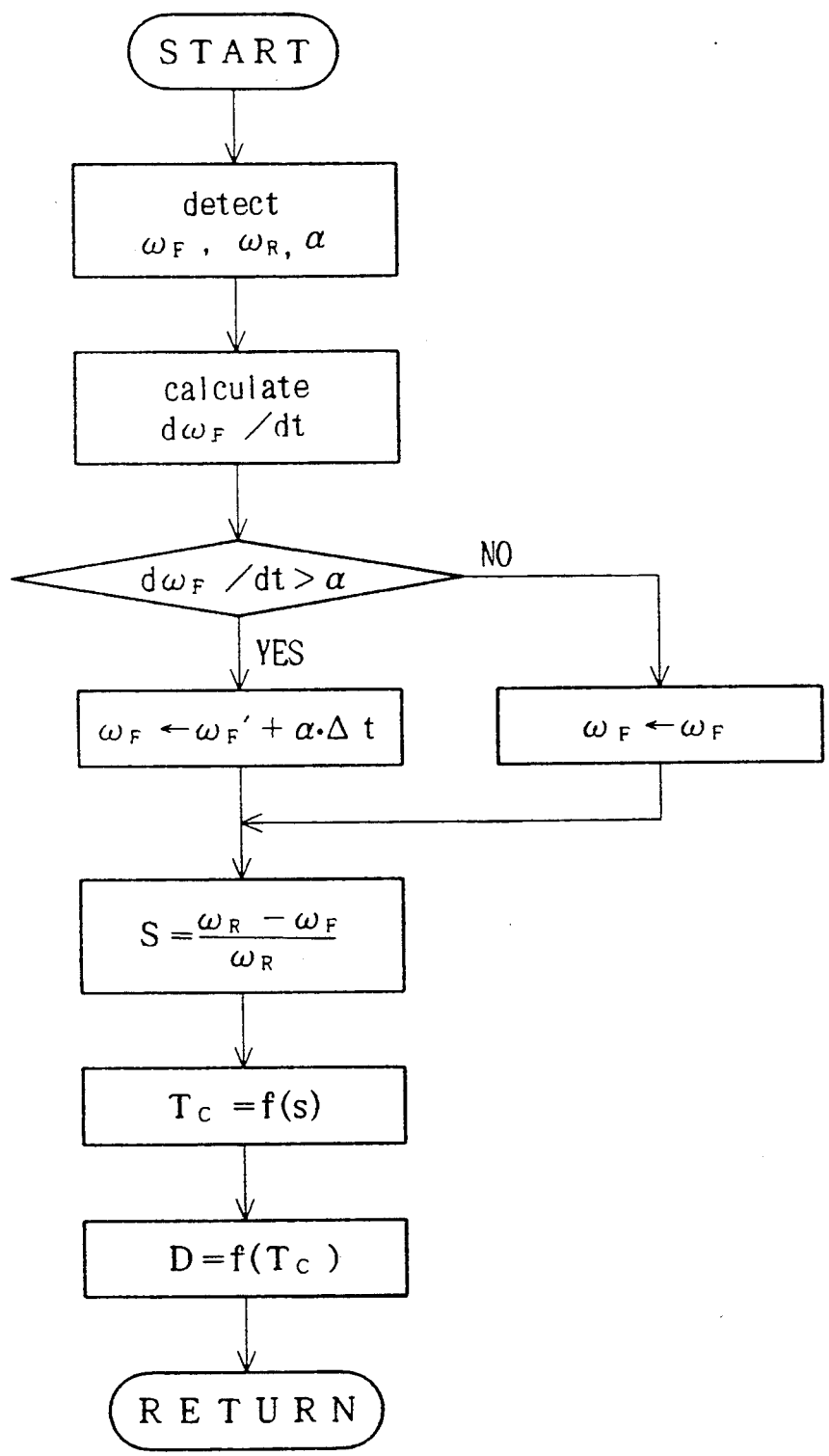
FIG. 6b is a flowchart showing the operation of the third embodiment.

FIGS. 6a, 6b shows a third embodiment of the present invention for correcting the front-wheel angular velocity $\omega F$ at slipping thereof at rapid acceleration.

If the measured front-wheel angular velocity $\omega F$ is used at slipping of the front wheels 9, the rear-wheel slip ratio S becomes smaller than the actual slip ratio because the front-wheel angular velocity $\omega F$ becomes higher than the ground speed V.

Referring to FIG. 6a, the control unit 50 is provided with an acceleration sensor 43. A vehicle body acceleration $\alpha$ detected by the acceleration sensor 43 is applied to a front-wheel slipping determining section 57. The rear-wheel angular velocity $\omega R$ detected by the sensor 41 is applied to the rear-wheel slip ratio calculator 51. The front-wheel angular velocity $\omega F$ is applied to a changing rate calculator 58 where a changing rate $d\omega F/dt$ of the front-wheel angular velocity $\omega F$ is calculated. The changing rate $d\omega F/dt$ is applied to the front-wheel slipping determining section 57 in which the changing rate $d\omega F/dt$ is compared with the vehicle body acceleration $\alpha$. If $d\omega F/dt > \alpha$, slipping of the front wheels 9 is determined. The result of the comparison and the acceleration $\alpha$ are applied to a front-wheel angular velocity correcting section 59 to which the front-wheel angular velocity $\omega F$ is also applied. In a slipping state, a corrected front-wheel angular velocity $\omega Fa$ is calculated as follows, using a front-wheel angular velocity $\omega F'$ before the slipping, the detected acceleration $\alpha$, and a calculating time increment $\Delta t$.

$$\omega Fa = \omega F + \alpha \cdot \Delta t$$

In a no slip state, the front-wheel angular velocity $\omega F$ is applied to the rear-wheel slip ratio calculator 51 through the section 59.

The operation of the system is shown in the flowchart of FIG. 6b. At acceleration, the vehicle body acceleration $\alpha$ and the changing rate $d\omega F/dt$ of the front-wheel angular velocity $\omega F$ are compared. When $d\omega F/dt > \alpha$, the front-wheel angular velocity $\omega F$ is corrected to the value corresponding to the actual vehicle speed in accordance with the angular velocity $\omega F'$ before the slipping and the vehicle body acceleration $\alpha$. Thus, the rear-wheel slip ratio S is accurately calculated, thereby properly controlling the torque distribution.

In accordance with the present invention, since large torque is transmitted to the rear wheels through the central differential, driving stability for the four-wheel drive system as well as cornering stability are improved.

The rear-wheel slip ratio is calculated to determine the differential operation restricting clutch torque for controlling the torque distribution. Since a necessary minimum torque is transmitted to the front wheels for preventing slipping, stability and steerability of the vehicle are enhanced.

The control range in accordance with the slip ratio is properly determined by the characteristics of the driving power and the sustainable side force. Thus, the tight corner braking is effectively prevented to ensure the driveability.

The rear-wheel slip ratio is calculated in accordance with the front-wheel speed as the vehicle speed, so that the calculation is simplified and correction of various factors can be easily achieved.

Since the rear-wheel slip ratio is corrected in accordance with the steering angle and the front-wheel slip rate, the accurate slip ratio is obtained corresponding to the actual driving conditions. Thus, the torque distribution is properly controlled.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. In a system for controlling torque distribution to front wheels and rear wheels of a motor vehicle having an engine, and a transmission connected to said engine for transmitting power to said wheels via a center differential interposed between said front wheels and rear wheels so as to distribute a larger torque to said rear wheels than to said front wheels, the center differential absorbing speed differences between said front wheels and rear wheels, the system comprising restricting means operatively connected to said center differential for distributing torque at different ratios to said rear wheels and to said front wheels, a front wheel speed sensor for detecting speed of said front wheels and for generating a corresponding front wheel speed signal, a rear wheel speed sensor for detecting speed of said rear wheels and for generating a corresponding rear wheel speed signal, and an acceleration sensor for detecting acceleration of said vehicle and for producing a corresponding acceleration signal, the improvement in the system which comprises:

a calculator responsive to said front wheel speed signal for calculating a changing rate of said front wheel speed and for producing a corresponding rate signal;

determining means responsive to said acceleration signal and said rate signal for determining front wheel slipping and for producing a slip signal when said front wheel slipping is determined;

correcting means responsive to said acceleration signal, said front wheel speed signal before the front wheel slipping and said slip signal for providing a corrected front wheel speed signal in accordance with said acceleration and said front wheel speed of said front wheels before the front wheel slipping;

calculating means responsive to said rear wheel speed signal and said corrected front wheel speed signal for calculating a slip ratio of said rear wheels and for generating a corresponding slip ratio signal;

setting means responsive to said slip ratio signal for deciding a corresponding restricting torque for said restricting means so as to optimumly distribute torque to said front wheels and said rear wheels without wheel slipping in any driving condition and for producing a corresponding restricting torque signal; and control means responsive to said restricting torque signal for controlling said restricting means, thereby optimumly distributing torque to said front wheels and said rear wheels without wheel slipping in any driving condition.

2. The system according to claim 1, wherein said restricting means is a fluid-operated restricting means.

3. The system according to claim 2, wherein said restricting means is a fluid-operated multiple-disk friction clutch.

4. The system according to claim 1, wherein said determining means determines the front wheel slipping and produces said slip signal when said changing rate of said front wheel speed is greater than the acceleration of said vehicle.

5. The system according to claim 1, wherein said correcting means in response to said acceleration signal, said front wheel speed signal before the front wheel slipping and said slip signal calculates said corrected front wheel speed signal by adding to said front wheel speed before the slipping the product of said acceleration and a calculating time increment.

6. The system according to claim 4, wherein said determining means determines the front wheel slipping and produces said slip signal when said changing rate of said front wheel speed is greater than the acceleration of said vehicle.

7. The system according to claim 1, wherein said calculating means is further responsive to said rear wheel speed signal and said first-mentioned front wheel speed signal for calculating a slip ratio of said rear wheels and for generating a corresponding slip ratio signal when said determining means does not produce said slip signal when said front wheels essentially do not slip.

8. The system according to claim 7, wherein said calculating means calculates said slip ratios by dividing the difference of said front, or respectively corrected front, and rear wheel speeds by said rear wheel speed.

9. The system according to claim 7, wherein said setting means decides a zero restricting torque for said restricting means, when said front wheels essentially do not slip and the corresponding slip ratio is essentially zero, so that said central differential is free.

10. The system according to claim 1, wherein said central differential comprises a planetary gear device including a first sun gear connected to an output shaft of the transmission, a carrier, first and second planet pinions integral with each other and rotatably supported on the carrier, and a second sun gear operatively connected to the rear wheels, the first planetary pinion being engaged with the first sun gear, and the second planetary pinion being engaged with the second sun gear.

* * * * *